US010549978B2

(12) United States Patent
Moezidis

(10) Patent No.: US 10,549,978 B2
(45) Date of Patent: Feb. 4, 2020

(54) REDUCING BEVERAGE SHRINKAGE AND MONITORING BEVERAGE DISPENSING EMPLOYEES TO REDUCE REVENUE LOSS

(71) Applicant: Nick Moezidis, San Jose, CA (US)

(72) Inventor: Nick Moezidis, San Jose, CA (US)

(73) Assignee: Nick Moezidis, San Jose, CA (US)

( * ) Notice: Subject to any disclaimer, the term of this patent is extended or adjusted under 35 U.S.C. 154(b) by 39 days.

(21) Appl. No.: 15/469,288

(22) Filed: Mar. 24, 2017

(65) Prior Publication Data

US 2017/0275147 A1 Sep. 28, 2017

Related U.S. Application Data

(60) Provisional application No. 62/312,622, filed on Mar. 24, 2016.

(51) Int. Cl.
| | |
|---|---|
| *B67D 3/00* | (2006.01) |
| *B67D 1/08* | (2006.01) |
| *B67D 1/12* | (2006.01) |
| *B67D 1/14* | (2006.01) |
| *G06Q 10/08* | (2012.01) |
| *G06K 19/077* | (2006.01) |

(52) U.S. Cl.
CPC ......... *B67D 3/0006* (2013.01); *B67D 1/0888* (2013.01); *B67D 1/1234* (2013.01); *B67D 1/1405* (2013.01); *B67D 3/0077* (2013.01); *B67D 3/0096* (2013.01); *G06K 19/07762* (2013.01); *G06Q 10/087* (2013.01); *B67D 2001/1483* (2013.01); *B67D 2210/00083* (2013.01)

(58) Field of Classification Search
CPC .. B67D 3/0006; B67D 1/0874; B67D 3/0077; B67D 1/0888; B67D 3/0096; B67D 1/1234; B67D 1/1405; B67D 2001/0811; B67D 2001/1483; B67D 2210/00083; G06K 7/10405; G06K 19/07705; G06K 19/07762; G06Q 10/087
See application file for complete search history.

(56) References Cited

U.S. PATENT DOCUMENTS 8,880,427 B1 * 11/2014 Jones ................... G06Q 10/087
705/22
9,364,116 B2 * 6/2016 Waldron ................. A47J 31/46
(Continued)

OTHER PUBLICATIONS

"How does iPourIt work?". Author Unknown. Retrieved from <https://www.ipouritinc.com/sp_faq/how-does-ipourit-work/> on Jan. 8, 2019. Originally published Jan. 2016.*

(Continued)

*Primary Examiner* — Nathan A Mitchell

(57) ABSTRACT

Beverage shrinkage monitoring technology is disclosed and is used to reduce beverage shrinkage at bars, clubs, restaurants, and other establishments that dispense beverages. Bottles are topped with wireless (RFID/Bluetooth/WiFi) enabled liquor/wine nozzles that only pour when handled by appropriate staff members who wear RFID wristbands or bracelets. The wireless (RFID/Bluetooth/WiFi) enabled liquor/wine nozzles also report sales to a point of sales (POS) system. Beer taps include proprietary wireless (RFID/Bluetooth/WiFi) enabled beer tap adapters that are mounted to or embedded in the beer taps.

10 Claims, 7 Drawing Sheets

(56) References Cited

U.S. PATENT DOCUMENTS

| | | | | |
|---|---|---|---|---|
| 9,708,170 B2* | 7/2017 | Segiet | B67D 1/0888 | |
| 2005/0194399 A1* | 9/2005 | Proctor | B67D 1/0007 | |
| | | | 222/1 | |
| 2007/0204930 A1* | 9/2007 | Phallen | B67D 1/1234 | |
| | | | 141/83 | |
| 2008/0195251 A1* | 8/2008 | Milner | B67D 3/0035 | |
| | | | 700/237 | |
| 2009/0177318 A1* | 7/2009 | Sizemore | G07F 9/026 | |
| | | | 700/236 | |
| 2011/0180563 A1* | 7/2011 | Fitchett | B67D 3/0051 | |
| | | | 222/1 | |
| 2011/0298583 A1* | 12/2011 | Libby | B67D 1/0041 | |
| | | | 340/5.28 | |
| 2012/0211516 A1* | 8/2012 | Zapp | B65D 25/48 | |
| | | | 222/20 | |
| 2014/0110018 A1* | 4/2014 | Scarvelli | B67D 3/0032 | |
| | | | 141/64 | |
| 2014/0166694 A1* | 6/2014 | Otto | B67D 1/0001 | |
| | | | 222/95 | |
| 2014/0263430 A1* | 9/2014 | Keating | B67D 3/0051 | |
| | | | 222/54 | |
| 2014/0351068 A1* | 11/2014 | Renfroe | G06Q 30/0641 | |
| | | | 705/15 | |
| 2016/0092851 A1* | 3/2016 | De Berg Hewett | B67D 1/0877 | |
| | | | 705/15 | |
| 2016/0363921 A1* | 12/2016 | Martindale | G05B 19/128 | |
| 2017/0174496 A1* | 6/2017 | Gold | B67D 1/06 | |
| 2017/0210610 A1* | 7/2017 | Henson | B67D 1/0085 | |

OTHER PUBLICATIONS

"RFID iPourIt Self Service Beer System, To Pour or Not to Pour". Blume, Shane. Retrieved from <https://www.eteknix.com/to-pour-or-not-to-pour/> on Jan. 8, 2019. Originally published Dec. 4, 2013.*

"RFID Users Help Themselves With Beer Server". Swedberg, Claire. RFID Journal. Jul. 2013.*

"iPourIt Serves Up 'Enhanced Customer Service' for Beer Drinkers". Swedberg, Claire. RFID Journal. Oct. 2012.*

* cited by examiner

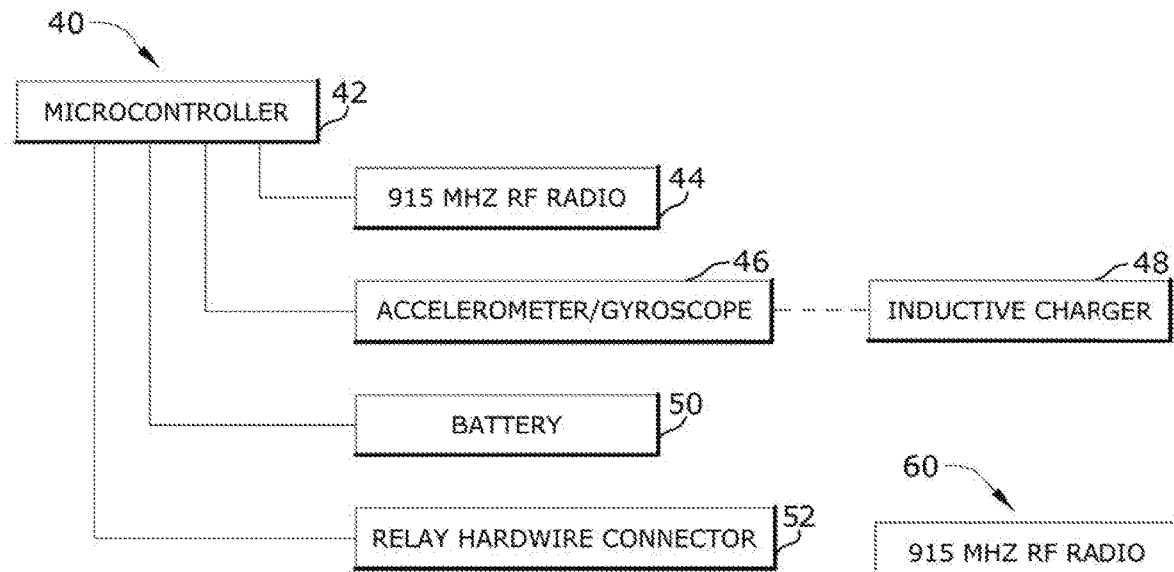
FIG.10
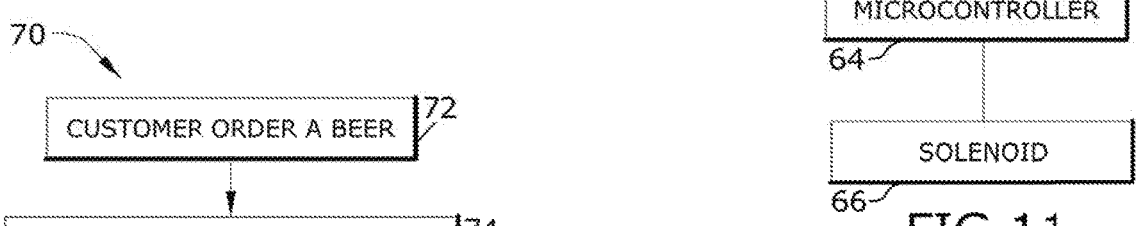
FIG.11
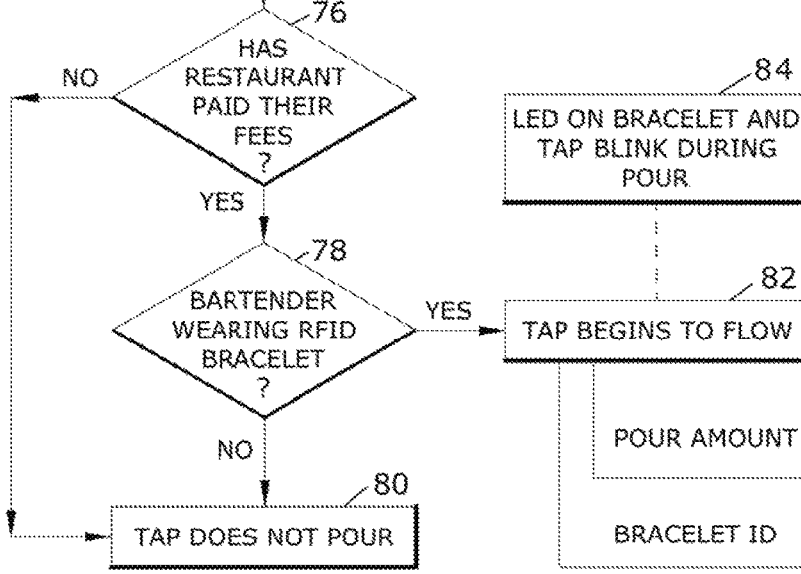
FIG.12
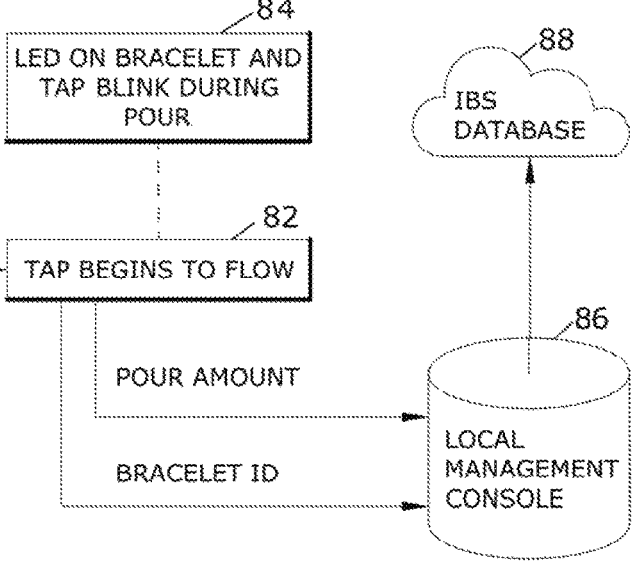

REDUCING BEVERAGE SHRINKAGE AND MONITORING BEVERAGE DISPENSING EMPLOYEES TO REDUCE REVENUE LOSS

CLAIM OF BENEFIT TO PRIOR APPLICATION

This application claims benefit to U.S. Provisional Patent Application 62/312,622, entitled "Bar Monitoring Technology used to reduce beverage shrinkage at bars and restaurants," filed Mar. 24, 2016. The U.S. Provisional Patent Application 62/312,622 is incorporated herein by reference.

BACKGROUND

Embodiments of the invention described in this specification relate generally to beverage shrinkage monitoring, and more particularly, to beverage shrinkage reduction processes and devices and a beverage dispensing monitoring system that reduces loss and beverage shrinkage.

A perennial problem for bars, restaurants, and other businesses that provide beverages (also known as "liquid assets" in a business context) in the regular operation of a business is shrinkage, which is an industry term for losing revenue on liquid assets due to bad practices—either inadvertent or deliberate (hereinafter referred to as "shrinkage", "bar shrinkage", or "beverage shrinkage"). Conventional systems track portions served or beverage inventory. Some of the conventional systems are designed to preserve liquid assets. Most conventional systems only address a single element, such as portion control, inventory tracking, sales tracking, or recipe accuracy, none of which individually have been able to mitigate the problems inherent with beverage shrinkage. In particular, none of the conventional systems closely track employees in relation to liquid assets. Instead, the conventional systems have relied on the honest and accurate work of employees and/or the vigilant observation of management to minimize beverage shrinkage. Unfortunately, these hopeful solutions have not been able to effectively reduce careless or deliberate shrinkage.

Stemming beverage shrinkage is particularly important when it comes to theft because many liquid asset-oriented businesses (e.g., bars, clubs, concessions, etc.) are cash businesses. When revenue is derived mainly from cash receipts, shrinkage by theft is common. Theft, by definition, includes giving away free drinks without authorization, over pouring alcohol, and pocketing some of the cash or taking a bottle out of inventory without permission for personal use or sale. The problem continues because too many dishonest or careless employees have taken advantage of the ongoing problem of shrinkage to conceal careless or dishonest work practices.

Therefore, what is needed is a way to ensure that employees or others are not carelessly dispensing beverages or deliberately dispensing beverages without appropriate payment or when not authorized.

BRIEF DESCRIPTION

In this specification, beverage shrinkage reduction processes and devices and a beverage dispensing monitoring system that reduces beverage shrinkage and revenue loss in the handling and dispensation of beverages at bars, restaurants, automated dispensing kiosks, and other beverage dispensing entities are disclosed.

In some embodiments, the beverage shrinkage reduction devices include a staff bracelet with a wireless identification device and a bracelet LED, a shrinkage reducing bottle nozzle that includes a wireless communication device and a bottle nozzle LED, a beverage controlling beer tap with a beer tap mounted beverage control device and an in-line flow meter, and a shrinkage reducing beer tap with a wireless communication device embedded in the beer tap handle and an accelerometer flow control device.

In some embodiments, the beverage shrinkage reduction processes include a bottled liquid shrinkage reduction process and a tap dispensed liquid shrinkage reduction process.

In some embodiments, the shrinkage reducing and monitoring system that reduces beverage shrinkage and revenue loss includes a shrinkage reducing and monitoring cloud server and a liquid assets database. In some embodiments, the shrinkage reducing and monitoring system includes a control console at each client location. The control console at each client location connects to the shrinkage reducing and monitoring server over the Internet and visually outputs information about beverages being dispensed, monitored by wireless communication and identification chip(s), and inventoried (saved) in the liquid assets database.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 10 conceptually illustrates a block diagram of a shrinkage reducing bottle nozzle in some embodiments.

FIG. 11 conceptually illustrates a block diagram of a control console in some embodiments.

FIG. 12 conceptually illustrates a tap dispensed liquid shrinkage reduction process for using a shrinkage reducing beer tap in some embodiments.

DETAILED DESCRIPTION

Figure 1:
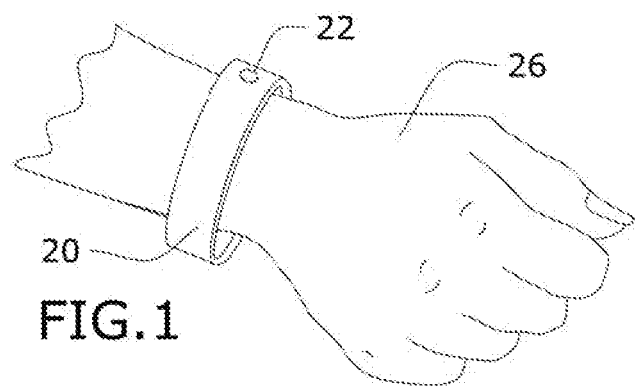
FIG. 1 conceptually illustrates a staff bracelet with a wireless identification device and LED in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include beverage shrinkage reduction devices and processes and a shrinkage reducing and monitoring system that reduces beverage shrinkage and revenue loss in the handling and dispensation of beverages at bars, restaurants, automated dispensing kiosks, and other beverage dispensing entities.

As stated above, liquid asset-oriented businesses have had problems dealing with inadvertent and deliberate beverage shrinkage and resulting loss of revenue. Conventional systems track portions served or beverage inventory or are designed to preserve liquid assets but most conventional systems only address a single element, such as portion control, inventory tracking, sales tracking, or recipe accuracy. When revenue is derived mainly from cash receipts, shrinkage by theft is common. Many dishonest or careless employees have taken advantage of the ongoing problem of shrinkage to conceal careless or dishonest work practices. To date, none of the conventional systems have been able to mitigate the problems inherent with beverage shrinkage. Embodiments of the beverage shrinkage reduction devices and processes and the shrinkage reducing and monitoring system described in this specification solve such problems by liquid asset and inventory monitoring technology that includes RFID bracelets which manage staff member identification and authorization, RFID/WiFi enabled liquor/wine toppers or bottle nozzles that only pour when handled by the appropriate staff member and report sales to the point of sales (POS) system, RFID/WiFi enabled beer handle mounted control device and RFID/WiFi enabled flow meters that measure beer and report beer sales into the POS system, a management console with an interface into the POS system, and a liquid assets inventory tracking database. The combination of the liquid asset and inventory monitoring technology is the most comprehensive and cost-effective portion and inventory control solution in the liquid assets business market, combining business intelligence, style, and ease of installation and use.

Embodiments of the beverage shrinkage reduction devices and processes and the shrinkage reducing and monitoring system described in this specification differ from and improve upon currently existing conventional options. In particular, some embodiments differ because there is no single conventional system that solves the shrinkage problem end to end. In contrast, embodiments of the beverage shrinkage reduction devices and processes and the shrinkage reducing and monitoring system described in this specification provide a single encompassing solution to reduce or eliminate bar shrinkage and to also track employee activity at all levels for better accuracy, security, and efficiency. This is solved by employees wearing RFID bracelets and having bottles topped with RFID/WiFi enabled liquor/wine nozzles that only pour when handled by the appropriate staff member, and by reporting sales to the POS system (also for beer sales, where a control device is mounted on the beer tap and can report beer sales into the POS system). Both the control device for beer taps and the bottle nozzles will report if they are removed from the beer tap handle or bottle. In this way, owners and operators always know if a pour was made incorrectly or when tracking is removed. In the end, the data for all such activities is stored in the liquid assets inventory database.

Owners or employees using the beverage shrinkage reduction devices and processes and the shrinkage reducing and monitoring system described in this specification would wear wireless communication bracelets (e.g., RFID, Bluetooth, or WiFi). The bottles would be topped with RFID/Bluetooth/WiFi enabled shrinkage reducing bottle nozzles that only pour when handled by the appropriate staff member and which report sales to the POS system. Additionally, RFID/Bluetooth/WiFi beer tap adapters are mounted on or embedded in beer taps to track and report beer sales into the POS system. If disengaged from a bottles or beer taps, the shrinkage reducing bottle nozzles track and report when they are removed from the bottles. In this way, the owner knows if a pour was done incorrectly, and can be double-checked with a review of the transactions saved in the liquid assets database, which tracks all of these activities. The liquor cabinet/store room may be provided with an RFID/Bluetooth/WiFi door lock and a bar code scanner to scan in and scan out the liquid assets inventory. An app with touch screen and pictures of bottles is provided to input initial inventory into the liquid assets database.

The beverage shrinkage reduction devices and processes and the shrinkage reducing and monitoring system of the present disclosure may be comprised of the following elements. This list of possible constituent elements is intended to be exemplary only and it is not intended that this list be used to limit the beverage shrinkage reduction devices and processes and the shrinkage reducing and monitoring system of the present application to just these elements. Persons having ordinary skill in the art relevant to the present disclosure may understand there to be equivalent elements that may be substituted within the present disclosure without changing the essential function or operation of the beverage shrinkage reduction devices and processes and the shrinkage reducing and monitoring system.

1. Liquid assets inventory database
2. Bottle nozzles
3. Beer tap mounted control device and in-line flow meter
4. Staff bracelets 5. Control console
6. Software subscription license
7. POS integration algorithm The beverage shrinkage reduction devices and processes and the shrinkage reducing and monitoring system of the present disclosure generally works in ways that operations in relation to items 1-5 can be done in any order. By way of example, however, clients (such as bar or club owners or operators) can enter their liquid assets inventory into the database (item #1). The bottle nozzles (item #2) are mounted/place on liquor or wine bottles and the beer tap mounted control devices and in-line flow meters (item #3) is mounted/connected to the beer taps. The bracelets (item #4) are worn by the bartender or authorized serving staff. Clients and users of the system may purchase a monthly subscription license (item #6) at a fee for the right to use the equipment. (If the client does not pay the system can be turned off similar to what cell phone, electricity or water companies do.) The control console (item #5) communicates with the bracelets (item #4), and/or the nozzles (item #2) and/or beer tap mounted control device (item #3) and/or the database (item #1) and/or the client's POS system (e.g., a cash register system) utilizing the POS integration algorithm (item #7) if desired. 7. Then, when a customer orders a drink, or is offered a drink, the bartender or authorized staff selects a bottle to pour from or a glass to pour from beer tap. When the bartender is wearing the bracelet (item #4) and the subscription license (item #6) fee has been paid the nozzles (item #2) and or beer tap mounted control device (item #3) pour desired amount into the glass, container, receptacle, holder, etc. The bottle nozzle (item #2) or beer tap mounted control device (item #3) reports back the dispensed amount to control console (item #5). The control console (item #5) in turn may report the sale to the client's POS system. Lastly, the control console (item #5) uploads the sales transaction in to the liquid assets database (item #1) for accurate inventory tracking.

All devices requiring electrical power and or battery will be able to use a battery charging bowl or inductive battery charging mat in addition to other power sources. The control console (item #5) uploads all sales transaction data in to the liquid assets inventory database (item #1), which may be a cloud-network database accessible to the control console via the Internet through a web service hosted by a server.

In some embodiments, the staff bracelet further works to authorize the operator to retrieve additional liquid assets in stock. For example, in the event that a bottle is empty the authorized operator would go to the appropriate storage area for a new bottle. The operator may use the staff bracelet (item #4) to gain access to a restricted area (which may be locked and can be unlocked by the staff bracelet, or simply by a key which is available by scanning the staff bracelet. Then the operator would be able to find the correct bottle in stock, scan it (e.g., using a bar code scanner) and bring the bottle back to the customer in need. Inventory would automatically be accounted for (e.g., by deducting the bottle from stock).

In some embodiments, the shrinkage reducing bottle nozzle and the shrinkage reducing beer tap adapter are configured to report back the dispensed amount to the control console (item #5). The control console, in turn, may report the sale to the POS system. In addition, the control console (item #5) uploads and saves the sales transaction in the liquid assets database (item #1) for accurate inventory tracking.

To make the beverage shrinkage reduction devices and processes and the shrinkage reducing and monitoring system of the present disclosure, a person would design shrinkage reducing bottle nozzles and beer tap control devices as well as write software to track the dispensing of liquids.

To use the beverage shrinkage reduction devices and processes and the shrinkage reducing and monitoring system of the present disclosure, a bar or restaurant owner may mount the devices to beer taps or replace conventional beer taps with shrinkage reducing beer taps that have embedded accelerometer devices to monitor the volume of fluid being dispensed. As for bottled beverages, the shrinkage reducing bottle nozzles could be engaged with existing spirit and wine bottles. Deployment of system software and operating system/platform on local computing devices, and configuration of cloud service to access the inventory database in relation to all beverage transactions.

I. Beverage Shrinkage Reduction Devices

In some embodiments, the beverage shrinkage reduction devices include a staff bracelet with a wireless identification device and a bracelet LED, a shrinkage reducing bottle nozzle that includes a wireless communication device and a bottle nozzle LED, a beverage controlling beer tap with a beer tap mounted beverage control device and an in-line flow meter, and a shrinkage reducing beer tap with a wireless communication device embedded in the beer tap handle and an accelerometer flow control device.

By way of example, FIG. 1 conceptually illustrates an example of a staff bracelet 20. As shown in this figure, the staff bracelet 20 wraps around the arm of an operator 26. The operator 26 can be, for example, a bar tender, a concessions stand server, a waiter, etc. The staff bracelet 20 includes a wireless identification device (not shown in this figure). The wireless identification device can be embedded in the staff bracelet 20. In some embodiments, the wireless identification device is an RFID tag or chip. In some embodiments, the wireless identification device is a WiFi device. In addition to the wireless identification device, the staff bracelet 20 of some embodiments includes an LED 22. In some embodiments, the staff bracelet LED 22 lights up when proximate to a bottle with a shrinkage reducing bottle nozzle engaged, a beverage controlling beer tap with a beer tap mounted beverage control device, or a shrinkage reducing beer tap with a wireless communication device embedded in the beer tap handle. In some embodiments, the operator 26 can pour liquid from the bottle or beer tap when the staff bracelet LED 22 is illuminated or lit up.

Figure 2:
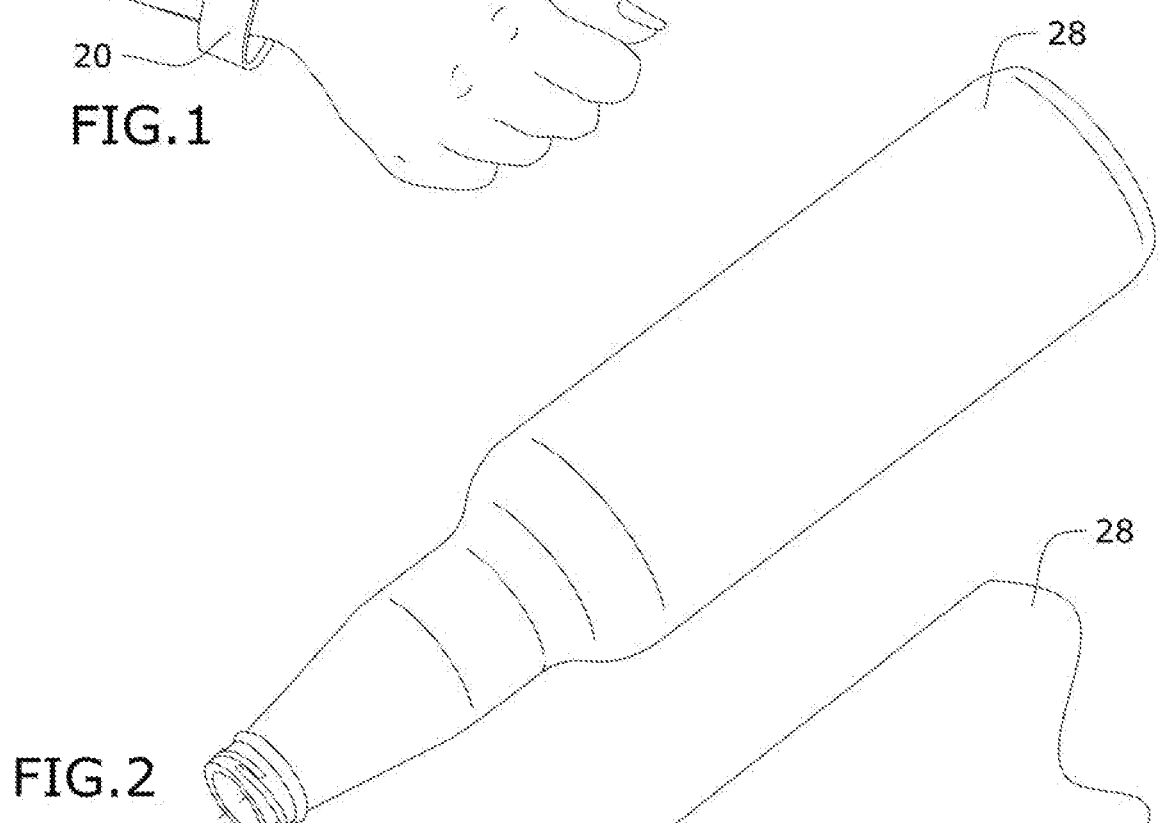
FIG. 2 conceptually illustrates a shrinkage reducing bottle nozzle with a wireless communication device in some embodiments.

Turning to another example, FIG. 2 conceptually illustrates a shrinkage reducing bottle nozzle 12 with a wireless communication device. As shown in this figure, the shrinkage reducing bottle nozzle 12 includes a bottle nozzle LED 14 and a wireless communication device 16 that is embedded within the shrinkage reducing bottle nozzle 12. In some embodiments, the shrinkage reducing bottle nozzle 12 engages with a bottle 28 to ensure monitored flow of liquid from the bottle 28. The wireless communication device 16 in the shrinkage reducing bottle nozzle 12 can be an RFID device, a WiFi device, a Bluetooth device, or another wireless device. As shown, the bottle nozzle LED 14 is visible on the shrinkage reducing bottle nozzle 12, lighting up when liquid can be poured out of the bottle 28 due to an authorized operator with a staff bracelet holding the bottle 28.

Figure 3:
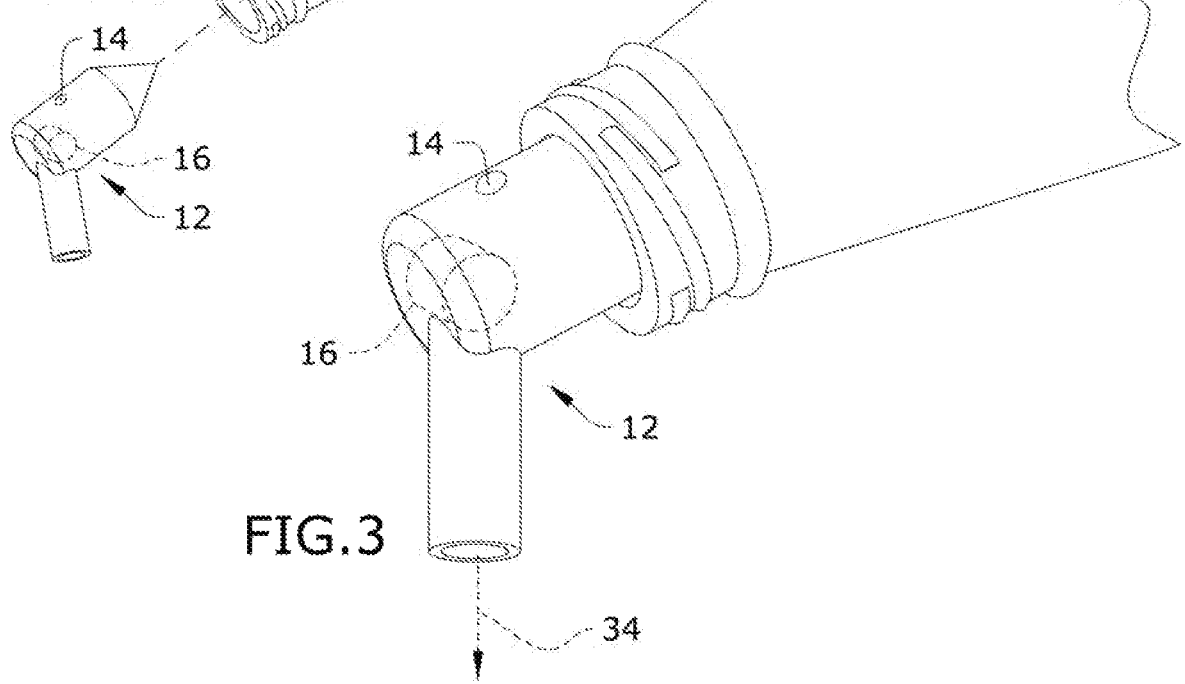
FIG. 3 conceptually illustrates the shrinkage reducing bottle nozzle engaged with a bottle with an open liquid flow from the nozzle in some embodiments.

Another view of the shrinkage reducing bottle nozzle 12 is shown by reference to FIG. 3, which conceptually illustrates the shrinkage reducing bottle nozzle 12 engaged with the bottle 28 with an open liquid flow 34 from the bottle 28 through the shrinkage reducing bottle nozzle 12.

Figure 4:
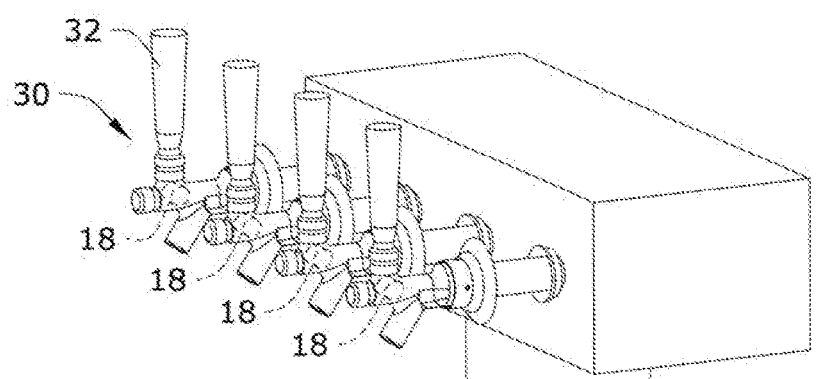
FIG. 4 conceptually illustrates several shrinkage controlled beer taps with beer tap mounted control devices and in-line flow meters in some embodiments.

In some embodiments, the liquid asset and inventory monitoring technology includes shrinkage reducing devices suitable for beer taps. By way of example, FIG. 4 conceptually illustrates several beverage controlling beer taps 30 with beer tap mounted control devices and in-line flow meters 18. As shown in this figure, each beverage controlling beer tap 30 has a beer tap handle 32 and a beer tap mounted control device and in-line flow meter 18. While a conventional beer tap dispenses fluid when the beer tap handle is pulled forward, the beer tap mounted control device and in-line flow meter 18 of the beverage controlling beer tap 30 prevents unauthorized pouring of beer from the beer tap unless an authorized operator 26 with a staff bracelet 20 is pulling the beer tap handle 32.

Figure 5:
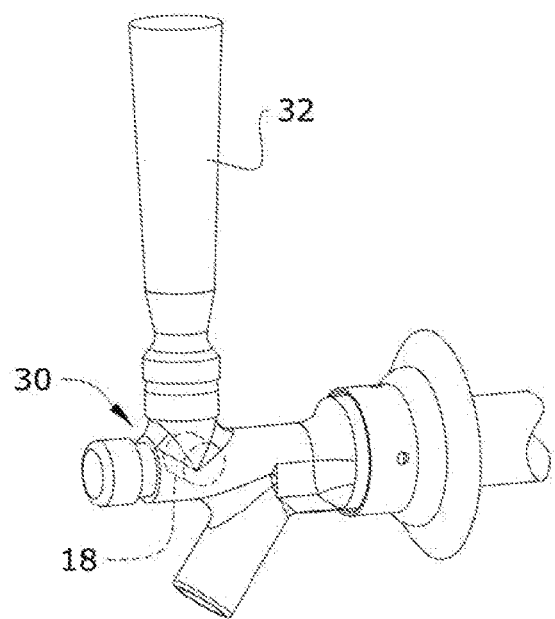
FIG. 5 conceptually illustrates a shrinkage controlled beer tap with beer tap mounted control device and in-line flow meter in a closed position.
Figure 6:
FIG. 6 conceptually illustrates the shrinkage controlled beer tap with beer tap mounted control device and in-line flow meter in an open position that allows liquid to flow.

By way of example, FIG. 5 conceptually illustrates the beverage controlling beer tap 30 with beer tap mounted control device and in-line flow meter 18 in a closed position that prevents the flow of liquid and FIG. 6 conceptually illustrates the beverage controlling beer tap 30 with beer tap mounted control device and in-line flow meter 18 in an open position that allows liquid to flow. Whereas a conventional beer tap would prevent fluid flow from the beer tap only when the beer tap handle is in the closed (upright position) and would always allow fluid flow from the beer tap when the beer tap handle is in the open (pulled forward) position, the beverage controlling beer tap 30 only releases fluid (e.g., beer) when an authorized operator 26 is pulling the beer tap handle 32 forward and is wearing the staff bracelet 20 with RFID identification tag. In other words, conventional beer taps have no mechanism to prevent or reduce bar shrinkage by the unauthorized pouring of beer from the beer tap, or from the accidental pouring of beer from the beer tap (e.g., the bartender inadvertently leaves the beer tap handle pulled forward after dispensing a glass of beer, or the beer tap handle has not been maintained to automatically swing back to the closed position after the bartender releases the handle).

The beverage controlling beer tap 30, on the other hand, prevents unauthorized operation of the beer tap. Additionally, the beverage controlling beer tap 30 of some embodiments measures the volume of fluid being released (by the authorized operator 26 wearing the staff bracelet 20) and automatically stops the fluid flow when a predetermined volume has been dispensed. For example, if a regular glass of beer is 16 ounces and a large glass of beer is 32 ounces, the beverage controlling beer tap 30 will measure the volume of beer being poured and automatically stop the flow of fluid for the size of beer the customer has paid for.

Figure 7:
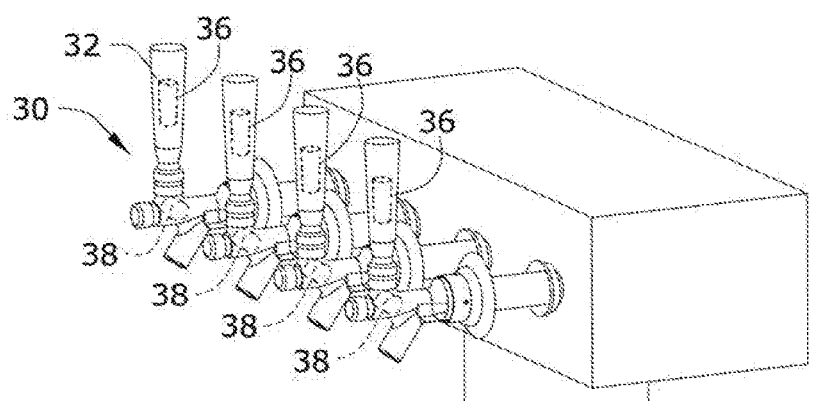
FIG. 7 conceptually illustrates several shrinkage reducing beer taps with wireless communication devices embedded in the beer tap handles and an accelerometer flow control device in some embodiments.
Figure 8:
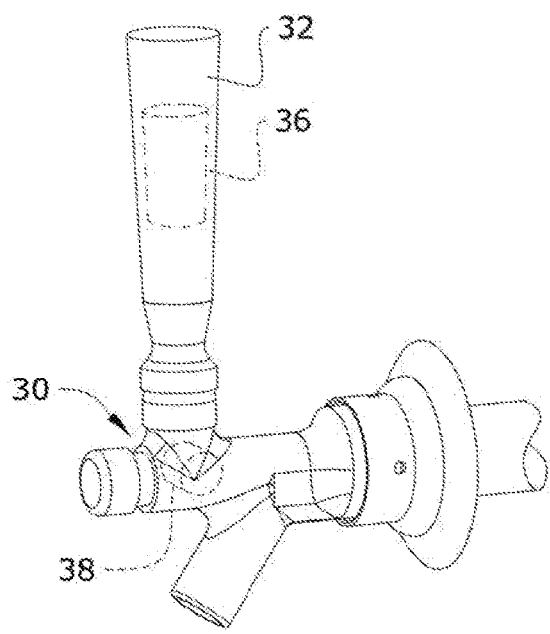
FIG. 8 conceptually illustrates a shrinkage reducing beer tap with embedded with wireless communication device and accelerometer flow control device in a closed position.
Figure 9:
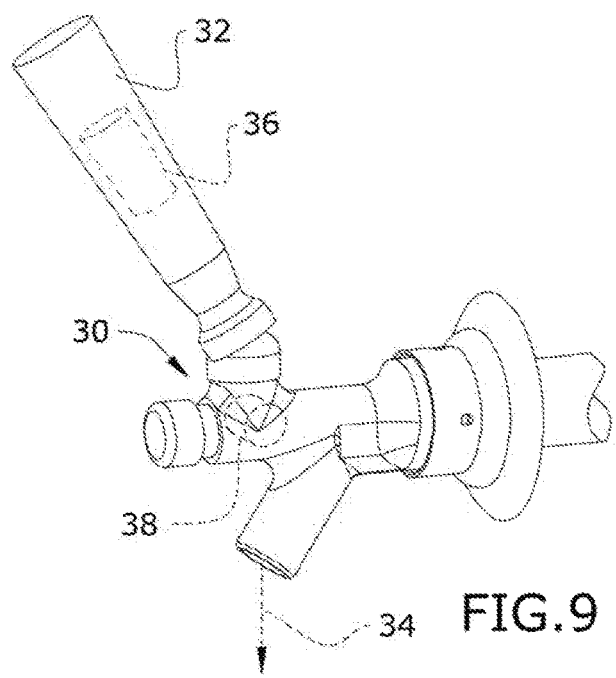
FIG. 9 conceptually illustrates the shrinkage reducing beer tap with embedded with wireless communication device and accelerometer flow control device in an open position that allows liquid to flow.

Another example of beer tap shrinkage monitoring technology is described by reference to FIGS. 7-9. Specifically, FIG. 7 conceptually illustrates several shrinkage reducing beer taps 30 with wireless communication devices 36 embedded in the beer tap handles 32 and an accelerometer flow control device 38 that prevents unauthorized pouring of beer (e.g., by employees or other people without a staff bracelet 20) and that measures the proper volume of liquid to dispense depending on the amount paid by the customer. In a closer view, FIG. 8 conceptually illustrates the shrinkage reducing beer tap 30 with the embedded wireless communication device 36 and the accelerometer flow control device 38 in a closed position (e.g., beer tap handle 32 in an upright configuration). By contrast, FIG. 9 conceptually illustrates the shrinkage reducing beer tap 30 with the embedded wireless communication device 36 and the accelerometer flow control device 38 in an open position (e.g., beer tap handle 32 pulled forward by authorized personnel wearing a staff bracelet 20) that allows liquid to flow 34.

By way of example, FIG. 10 conceptually illustrates a shrinkage reducing bottle nozzle block diagram 40. As shown in this figure, the shrinkage reducing bottle nozzle block diagram 40 includes a micro-controller 42, an RF radio 44, an accelerometer/gyroscope 46, an inductive charger 48, a battery 50, and a relay hardwire connector 52. In this block diagram, the RF radio 44 is configured at 915 megahertz (MHZ). The accelerometer 46 is combined with a gyroscope, although in some configurations of the shrinkage reducing bottle nozzle, the accelerometer 46 can be an entirely separate device from the gyroscope. In some embodiments, the shrinkage reducing bottle nozzle includes a rechargeable battery 50 that can be charged by an inductive charger 48, such as an inductive charging mat. In some embodiments, the shrinkage reducing bottle nozzle also includes the bottle nozzle LED and a photo-transistor that lights up the bottle nozzle LED when an authorized operator is wearing a staff bracelet while holding the bottle. In some embodiments, the shrinkage reducing bottle nozzle also includes a solenoid that powers the shrinkage reducing bottle nozzle to change between open and closed configurations. Now, FIG. 11 conceptually illustrates a block diagram 60 of control devices RF radio 62 configured at 915 MHZ, a micro-controller 64, and a solenoid 66.

II. Beverage Shrinkage Reduction Processes

In some embodiments, the beverage shrinkage reduction processes include a bottled liquid shrinkage reduction process and a tap dispensed liquid shrinkage reduction process for using a shrinkage reducing beer tap to reduce or eliminate bar shrinkage.

By way of example, FIG. 12 conceptually illustrates a tap dispensed liquid shrinkage reduction process 70 for using a shrinkage reducing beer tap to reduce or eliminate beverage or bar shrinkage. The process 70 starts when a customer orders (at 72) a beer. In response to the customer's order, a bartender then picks up a glass and holds it under a shrinkage reducing beer tap (at 74). In some embodiments, the process 70 then determines (at 76) whether the establishment (e.g., the restaurant, bar, club, etc.) has paid fees in connection with using the shrinkage reducing beer tap. When the establishment has not paid fees in connection with using the shrinkage reducing beer tap, the process 70 of some embodiments transitions to step 80, at which the shrinkage reducing beer tap does not pour.

On the other hand, when the establishment has paid fees in connection with using the shrinkage reducing beer tap, the process 70 of some embodiments then determines (at 78) whether the bartender (or person trying to dispense the beer) is wearing the RFID bracelet. When the bartender (or person trying to dispense the beer) is not wearing the RFID bracelet, then the process 70 of some embodiments transitions to step 80, where the shrinkage reducing beer tap does not pour.

On the other hand, when the bartender (or person trying to dispense the beer) is wearing the RFID bracelet, then the tap begins to flow (at 82 of the process 70). In some embodiments, when the RFID bracelet includes the staff bracelet LED, the LED on the bracelet and on the beer tap blink (at 84) while dispensing beer. In some embodiments, the process 70 then transmits the pour amount and the staff bracelet ID to the local management console 86 for storage in the inventory database 88.

Figure 13:
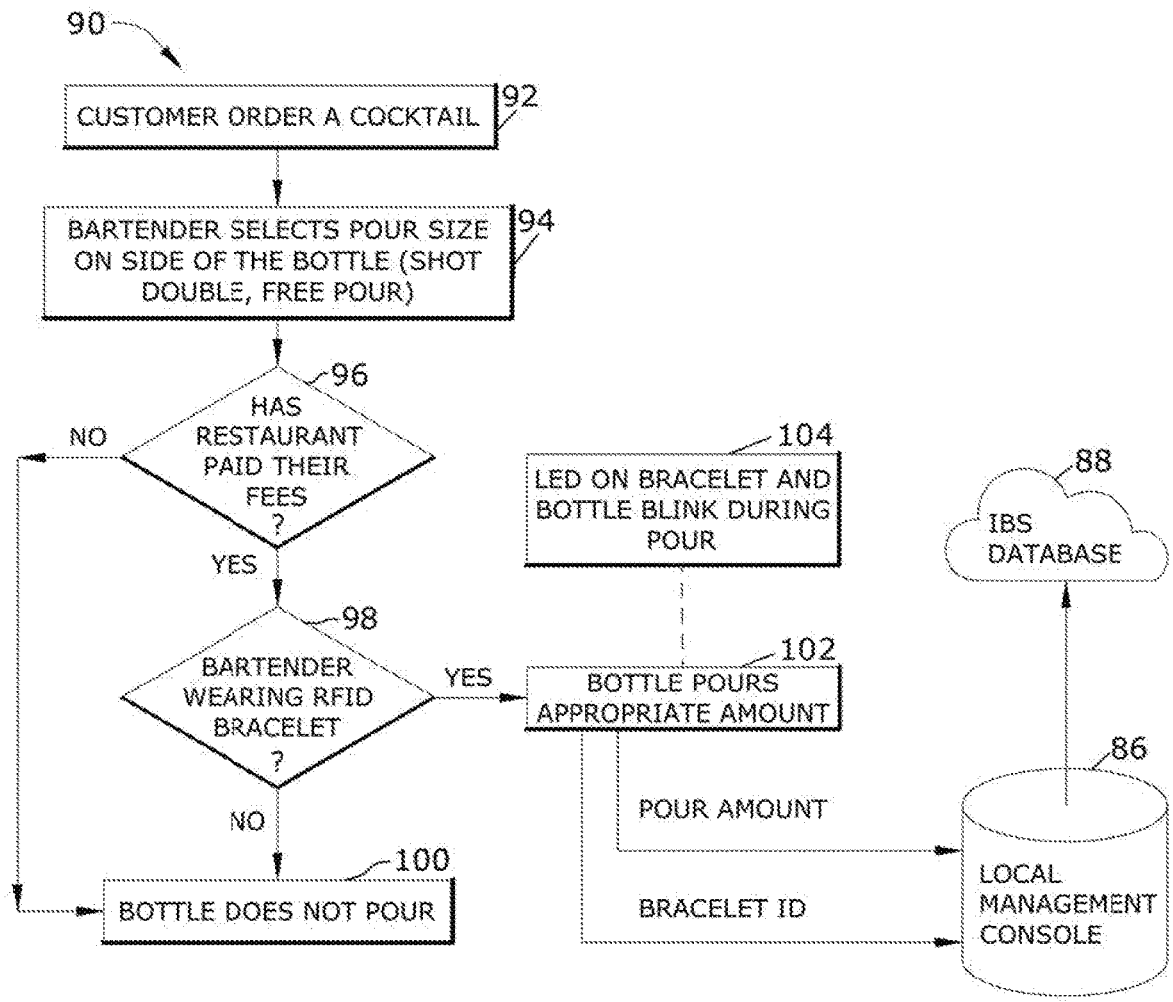
FIG. 13 conceptually illustrates a bottled liquid shrinkage reduction process for using a shrinkage reducing bottle nozzle in some embodiments.

Turning to another example process for reducing bar shrinkage, FIG. 13 conceptually illustrates a bottled liquid shrinkage reduction process 90 for using a shrinkage reducing bottle nozzle to reduce or eliminate beverage shrinkage. As shown in this figure, the process 90 starts when a customer orders (at 92) a cocktail (or another bottled beverage, such as wine, liquor, etc.). In response to the customer's order, a bartender selects (at 94) a pour size on the side of the bottle. In some embodiments, the pour size can be selected from a plurality of pour sizes comprising a measured shot size, a measured double shot size, and an unmeasured free pour size.

In some embodiments, the process 90 then determines (at 96) whether the establishment (e.g., the restaurant, bar, club, etc.) has paid fees in connection with using the shrinkage reducing bottle nozzle. When the establishment has not paid fees in connection with using the shrinkage reducing bottle nozzle, the process 90 of some embodiments transitions to step 100, at which the shrinkage reducing bottle nozzle prevents liquid from being released when the bottle is titled down to pour.

On the other hand, when the establishment has paid fees in connection with using the shrinkage reducing bottle nozzle, the process 90 of some embodiments then determines (at 98) whether the bartender (or person trying to dispense the liquid in the bottle) is wearing the RFID staff bracelet. When the bartender (or person trying to dispense the liquid) is not wearing the RFID staff bracelet, then the process 90 transitions to step 100, where the bottle with the engaged shrinkage reducing bottle nozzle does not pour.

On the other hand, when the bartender is wearing the RFID staff bracelet, then the bottle begins to pour (at 102) the appropriate amount of liquid from the bottle. In some embodiments, when the RFID staff bracelet includes the staff bracelet LED, the LED on the staff bracelet and on the bottle blink (at 104) while pouring. In some embodiments, the process 90 then transmits the pour amount and the staff bracelet ID to the local management console 86 for storage in the inventory database 88.

III. Shrinkage Reducing and Monitoring System

In some embodiments, the shrinkage reducing and monitoring system that reduces beverage shrinkage and revenue loss includes a shrinkage reducing and monitoring cloud server and a liquid assets database. In some embodiments, the shrinkage reducing and monitoring system includes a control console at each client location. The control console at each client location connects to the shrinkage reducing and monitoring server over the Internet and visually outputs information about beverages being dispensed, monitored by wireless communication and identification chip(s), and inventoried (saved) in the liquid assets database.

Figure 14:
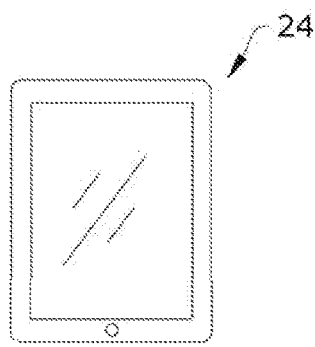
FIG. 14 conceptually illustrates a control console in some embodiments.
Figure 15:
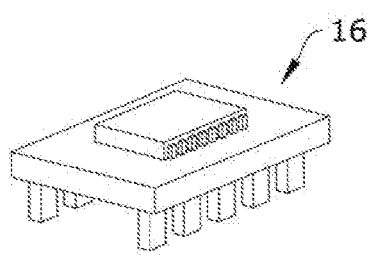
FIG. 15 conceptually illustrates shrinkage reducing wireless communication device in some embodiments.
Figure 16:
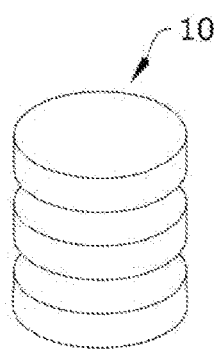
FIG. 16 conceptually illustrates a liquid assets database in some embodiments.

By way of example, FIG. 14 conceptually illustrates a control console 24 that is used to visually output information about the beverages being dispensed and poured. Turning now to another example, FIG. 15 conceptually illustrates shrinkage reducing wireless communication device 16 used to ensure that only authorized operators are able to pour beverages from bottles that are fitted with shrinkage reducing bottle nozzles that each have a shrinkage reducing wireless communication device 16 or from shrinkage reducing beer taps with shrinkage reducing wireless communication devices 16 embedded in the beer tap handles and either in-line or accelerometer flow control devices. When the control console 24 described by reference to FIG. 14 visually outputs information about the beverages being dispensed and poured, a point of sales (POS) system may be linked with the shrinkage reducing and monitoring system. In some embodiments, the information is saved in a liquid assets database. By way of example, FIG. 16 conceptually illustrates an example of a liquid assets database 10. The liquid assets database 10 shown in this figure may be a cloud database that is communicably connected to the shrinkage reducing and monitoring system, or may be a local database that is directly connected to a cloud server of the shrinkage reducing and monitoring system.

Figure 17:
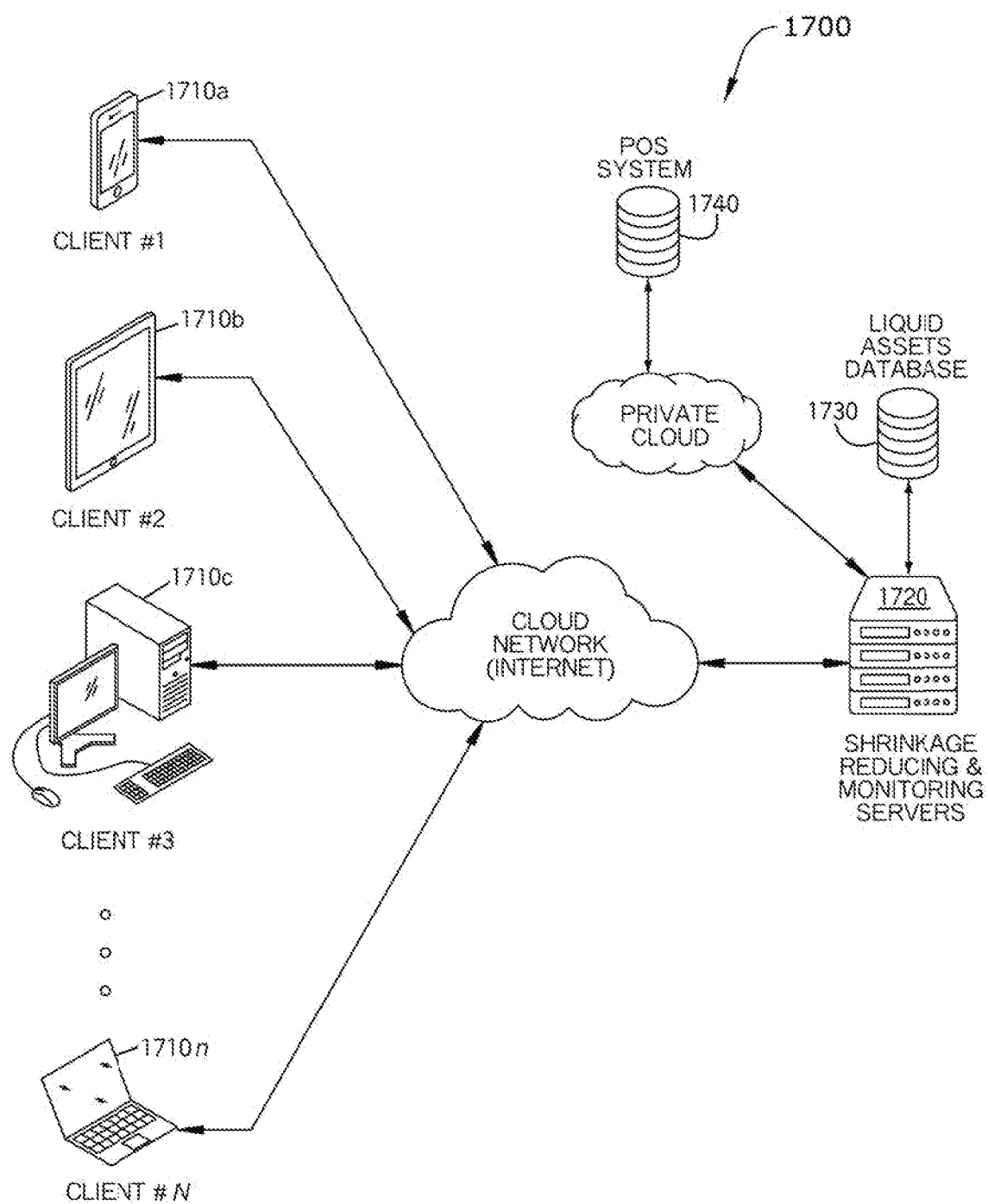
FIG. 17 conceptually illustrates a cloud-network architecture of a shrinkage reducing and monitoring system in some embodiments.

By way of example, FIG. 17 conceptually illustrates a cloud-network architecture of a shrinkage reducing and monitoring system 1700. As shown in this figure, the shrinkage reducing and monitoring system 1700 includes a plurality of control console client computing devices 1710*a*, 1710*b*, 1710*c*, . . . , 1710*n*, one or more shrinkage reducing and monitoring servers 1720, a liquid assets database 1730, and a point of sales (POS) system 1740. Each of the control console client computing devices 1710*a*, 1710*b*, 1710*c*, . . . , 1710*n* connect to a shrinkage reducing and monitoring server 1720 over the Internet from a location, such as a bar, a club, a restaurant, a concessions box, or another location where beverages are served and shrinkage is a problem. The liquid assets database 1730 is either directly connected to a shrinkage reducing and monitoring server 1720, such as a database management server among the shrinkage reducing and monitoring servers 1720, or communicatively connected to all of the shrinkage reducing and monitoring servers 1720. In some embodiments, the number of shrinkage reducing and monitoring servers 1720 is scalable to accommodate the number of establishments with paid memberships. In this way, the network traffic is managed so that all control console client computing devices 1710*a*-1710*n* can access the shrinkage reducing and monitoring servers 1720 and the liquid assets database 1730 contemporaneously with each other.

While the shrinkage reducing and monitoring system 1700 includes POS system 1740 in connection with the shrinkage reducing and monitoring servers 1720 (over a private cloud network connection), additional POS systems could be deployed, such that each control console client computing device is associated with a separate and distinct POS system. Additionally, the liquid assets database 1730 can be a single database or multiple databases that are logically connected together and are accessed through a single interfacing application. Furthermore, one or more of the shrinkage reducing and monitoring servers can be a web server that requires clients to login with verifiable credentials (such as username/password) and performs authentication of the control console client computing devices 1710*a*-1710*n*. Additionally, one or more databases may be deployed as server-side databases storing user login and authentication data, paid registration accounts, accounting databases to manage client fees, and other such databases for data storage needs in direct operation of one or more of the shrinkage reducing and monitoring servers 1720.

The above-described embodiments of the invention are presented for purposes of illustration and not of limitation.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 18:
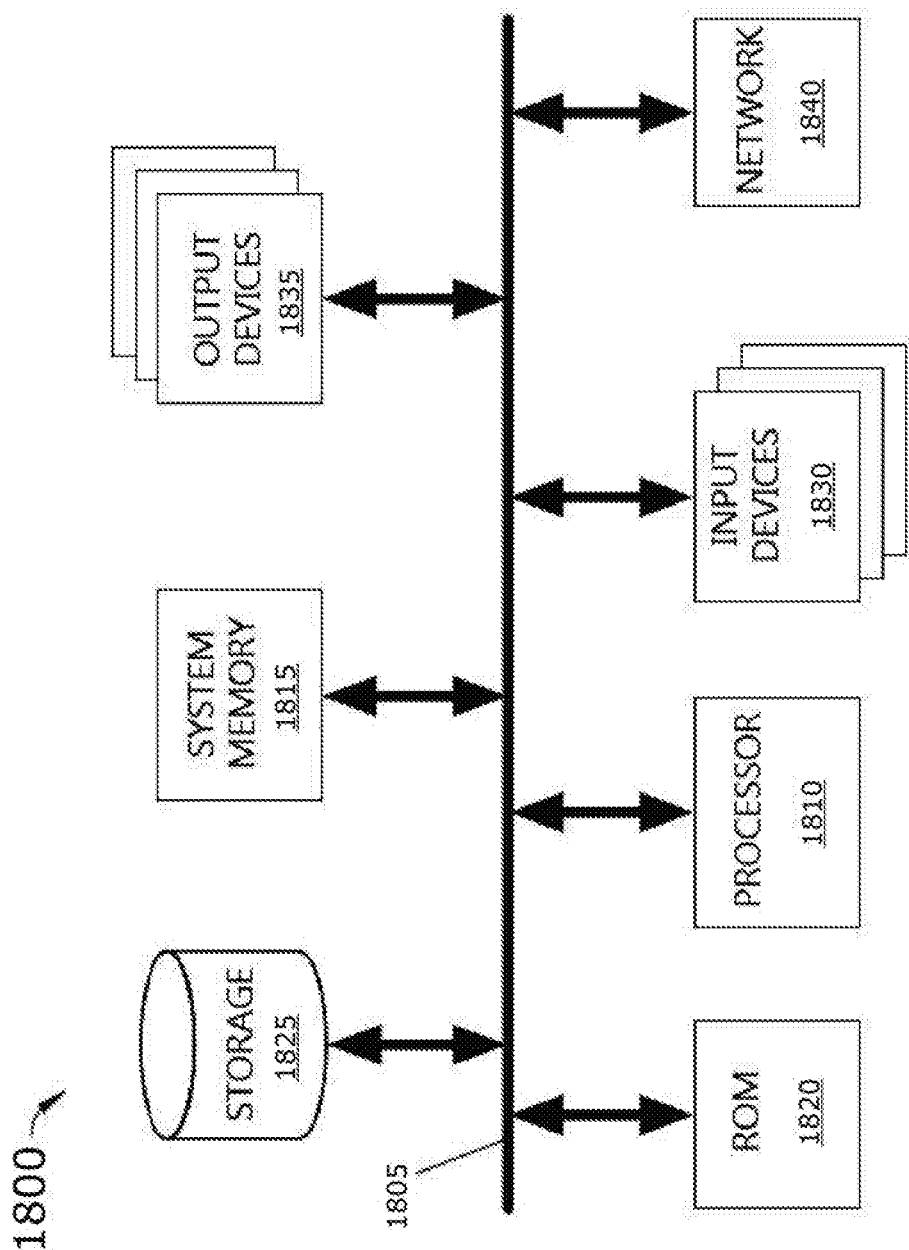
FIG. 18 conceptually illustrates an electronic system with which some embodiments of the invention are implemented.

FIG. 18 conceptually illustrates an electronic system 1800 with which some embodiments of the invention are implemented. The electronic system 1800 may be a computer, phone, PDA, or any other sort of electronic device. Such an electronic system includes various types of computer readable media and interfaces for various other types of computer readable media. Electronic system 1800 includes a bus 1805, processing unit(s) 1810, a system memory 1815, a read-only 1820, a permanent storage device 1825, input devices 1830, output devices 1835, and a network 1840.

The bus 1805 collectively represents all system, peripheral, and chipset buses that communicatively connect the numerous internal devices of the electronic system 1800. For instance, the bus 1805 communicatively connects the processing unit(s) 1810 with the read-only 1820, the system memory 1815, and the permanent storage device 1825.

From these various memory units, the processing unit(s) 1810 retrieves instructions to execute and data to process in order to execute the processes of the invention. The processing unit(s) may be a single processor or a multi-core processor in different embodiments.

The read-only-memory (ROM) 1820 stores static data and instructions that are needed by the processing unit(s) 1810 and other modules of the electronic system. The permanent storage device 1825, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1825.

Other embodiments use a removable storage device (such as a floppy disk or a flash drive) as the permanent storage device 1825. Like the permanent storage device 1825, the system memory 1815 is a read-and-write memory device. However, unlike storage device 1825, the system memory 1815 is a volatile read-and-write memory, such as a random access memory. The system memory 1815 stores some of the instructions and data that the processor needs at runtime. In some embodiments, the invention's processes are stored in the system memory 1815, the permanent storage device 1825, and/or the read-only 1820. For example, the various memory units include instructions for processing appearance alterations of displayable characters in accordance with some embodiments. From these various memory units, the processing unit(s) 1810 retrieves instructions to execute and data to process in order to execute the processes of some embodiments.

The bus 1805 also connects to the input and output devices 1830 and 1835. The input devices enable the user to communicate information and select commands to the electronic system. The input devices 1830 include alphanumeric keyboards and pointing devices (also called "cursor control devices"). The output devices 1835 display images generated by the electronic system 1800. The output devices 1835 include printers and display devices, such as cathode ray tubes (CRT) or liquid crystal displays (LCD). Some embodiments include devices such as a touchscreen that functions as both input and output devices.

Finally, as shown in FIG. 18, bus 1805 also couples electronic system 1800 to a network 1840 through a network adapter (not shown). In this manner, the computer can be a part of a network of computers (such as a local area network ("LAN"), a wide area network ("WAN"), or an intranet), or a network of networks (such as the Internet). Any or all components of electronic system 1800 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 12 and 13 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A beer tap shrinkage reducing system that prevents unauthorized and inappropriate dispensation of liquid from a beer tap, said beer tap shrinkage reducing system comprising:

a staff bracelet that fits on a wrist of an operator authorized to dispense beer at an establishment, the staff bracelet comprising a staff bracelet RFID tag that uniquely identifies the operator as being authorized to dispense beer at the establishment;

a local management console that connects to a point of sale (POS) system of the establishment and sets an amount of liquid to dispense based on each liquid sales transaction entered into the POS system by the operator authorized to dispense beer at the establishment;

a liquid assets inventory database that tracks inventory of liquids based on dispensed amounts of liquid in connection with liquid sales transactions; and a shrinkage reducing beer tap comprising a beer tap handle, a beer tap RFID communication device embedded within the beer tap handle, a beer tap line and spout, and a beer tap RFID control device embedded within the beer tap line and spout that receives a signal from the beer tap RFID communication device when the staff bracelet RFID tag is positioned proximate to the beer tap handle, wherein when the beer tap handle is pulled forward by the operator, the beer tap RFID communication device sends a signal to the beer tap RFID control device to dispense liquid when the staff bracelet RFID tag is nearby the beer tap RFID communication device, wherein the beer tap RFID control device reports a dispensed amount to the local management console for inventory tracking in the liquid assets inventory database.

2. The beer tap shrinkage reducing system of claim 1, wherein the shrinkage reducing beer tap is configured to dispense a set volume of liquid when the beer tap handle is pulled forward and the staff bracelet RFID tag is nearby the beer tap RFID communication device.

3. The beer tap shrinkage reducing system of claim 2, wherein the beer tap RFID control device comprises an in-line flow meter that measures the volume of liquid being dispensed when the beer tap handle is pulled forward and the staff bracelet RFID tag is nearby the beer tap RFID communication device.

4. The bottled beverage shrinkage reducing system of claim 2, wherein the beer tap RFID control device comprises an accelerometer flow control device that measures flow of the liquid being dispensed when the beer tap handle is pulled forward and the staff bracelet RFID tag is nearby the beer tap RFID communication device.

5. The bottled beverage shrinkage reducing system of 3, wherein the set volume of liquid is set by the local management console based on a particular volume of liquid associated with a liquid sales transaction entered into the POS system by the operator.

6. The bottled beverage shrinkage reducing system of 5, wherein the shrinkage reducing beer tap stops dispensation of the liquid when the in-line flow meter measures the set volume of liquid.

7. The bottled beverage shrinkage reducing system of claim 1, wherein the staff bracelet further comprises a bracelet LED that lights up when the staff bracelet is proximate to the shrinkage reducing beer tap.

8. The bottled beverage shrinkage reducing system of claim 7, wherein the shrinkage reducing beer tap further comprises a beer tap LED that blinks when the staff bracelet is proximate to the shrinkage reducing beer tap and the shrinkage reducing beer tap is dispensing liquid.

9. The bottled beverage shrinkage reducing system of claim 4, wherein the shrinkage reducing beer tap turns off the flow of the liquid being dispensed when the accelerometer flow control device determines that dispensed liquid equals the set volume of liquid.

10. The bottled beverage shrinkage reducing system of claim 9, wherein the shrinkage reducing beer tap turns off the flow of the liquid being dispensed when the accelerometer flow control device determines that dispensed liquid equals the set volume of liquid and the beer tap handle remains in a forward position after the operator pulled the beer tap handle forward to start dispensation of the liquid.

* * * * *